(12) United States Patent
Thorstensson et al.

(10) Patent No.: US 8,923,841 B2
(45) Date of Patent: Dec. 30, 2014

(54) METHOD FOR IDENTIFYING A MOBILE TELEPHONE

(75) Inventors: Pär Thorstensson, Stockholm (SE); Tomi Ronkainen, Atlanta, GA (US)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/258,196

(22) PCT Filed: Mar. 26, 2010

(86) PCT No.: PCT/EP2010/054009
§ 371 (c)(1),
(2), (4) Date: Nov. 17, 2011

(87) PCT Pub. No.: WO2010/115732
PCT Pub. Date: Oct. 14, 2010

(65) Prior Publication Data
US 2012/0108228 A1    May 3, 2012

(30) Foreign Application Priority Data
Apr. 9, 2009   (SE) ........................ 0950235

(51) Int. Cl.
*H04W 4/00* (2009.01)
*H04W 12/12* (2009.01)
*H04L 29/06* (2006.01)
*H04W 8/24* (2009.01)
*H04W 88/02* (2009.01)

(52) U.S. Cl.
CPC ............ *H04W 12/12* (2013.01); *H04L 63/126* (2013.01); *H04W 8/24* (2013.01); *H04W 88/02* (2013.01)
USPC ...................................... 455/422.1; 370/477

(58) Field of Classification Search
USPC ................ 455/422.1, 425, 466, 558; 370/477
See application file for complete search history.

(56) References Cited

U.S. PATENT DOCUMENTS

| | | | |
|---|---|---|---|
| 2003/0061488 A1 | 3/2003 | Huebler | |
| 2005/0282584 A1 | 12/2005 | Faisy | |
| 2007/0076760 A1* | 4/2007 | Wennberg et al. ............ 370/477 |

(Continued)

FOREIGN PATENT DOCUMENTS

EP   1860858   11/2007

OTHER PUBLICATIONS

International Search Report dated Jun. 16, 2010, in corresponding PCT application.

*Primary Examiner* — Myron K Wyche
(74) *Attorney, Agent, or Firm* — Workman Nydegger

(57) ABSTRACT

Method for identifying a mobile telephone, a device, where there is a ADD system (1) (Automatic Device Detection) system connected to a network (2) for mobile communication, the ADD system including a TCD (3) (Terminal Capabilities Database) with SAT (SIM Application Toolkit) terminal profile values stored for all device (4) models. The method includes the steps of retrieving the IMEI (International Mobile Equipment Identity) number from the device (4), retrieving the device model and the SAT terminal profile (P2) from the TCD by way of the retrieved IMEI, obtaining the SAT terminal profile (P1) of the actual device, comparing the SAT terminal profile (P1) of the actual device with the SAT terminal profile (P2) obtained from the TCD in the ADD system, and considering the device as having the right IMEI number when the SAT terminal profile of the actual device and the SAT terminal profile obtained from the TCD coincide.

15 Claims, 2 Drawing Sheets

(56) References Cited

U.S. PATENT DOCUMENTS

Figure 1:
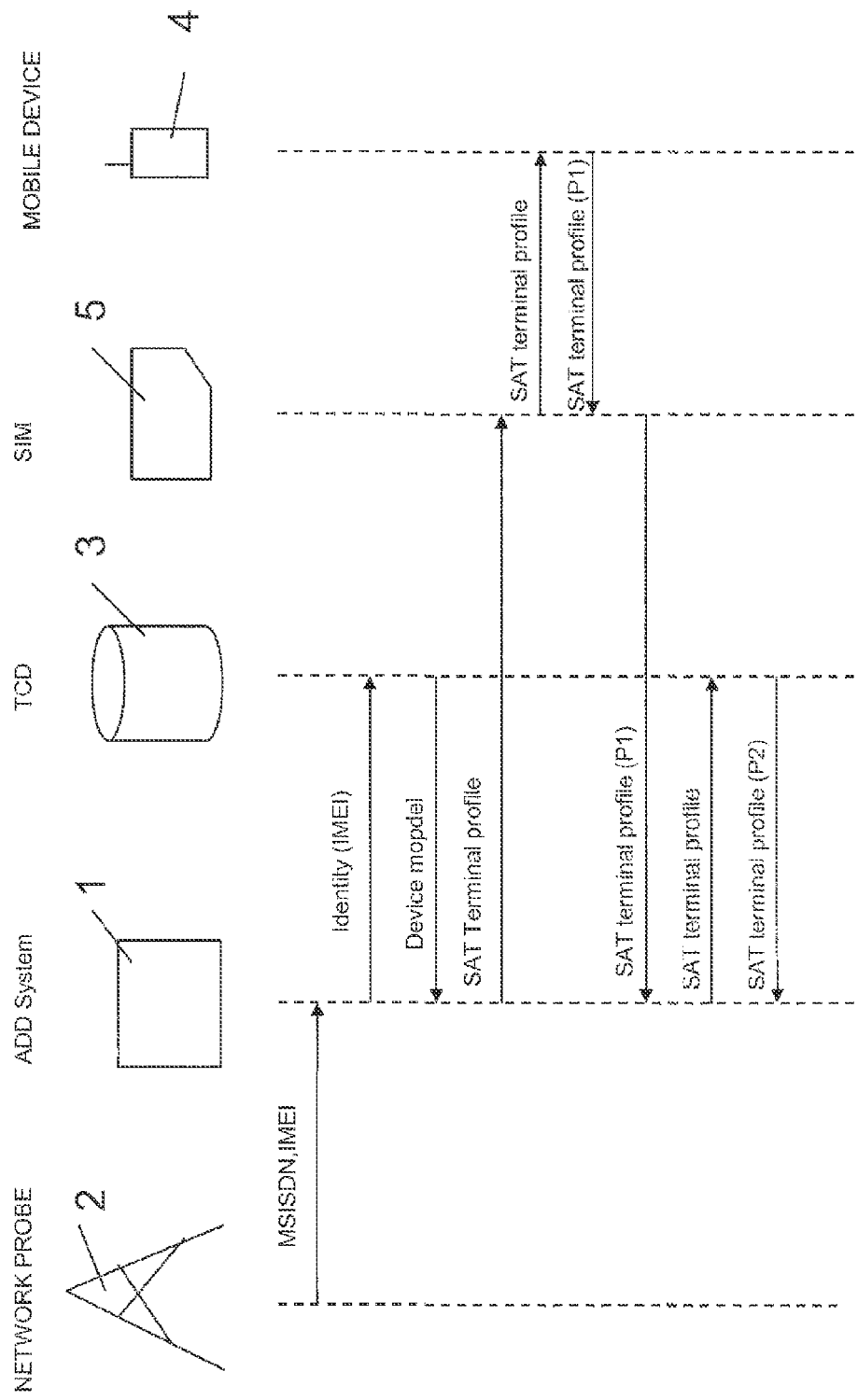

2009/0061863 A1  3/2009  Huggett
2009/0094458 A1* 4/2009  Dionisio .................. 713/171
2009/0124251 A1* 5/2009  Niccolini ................. 455/425

* cited by examiner

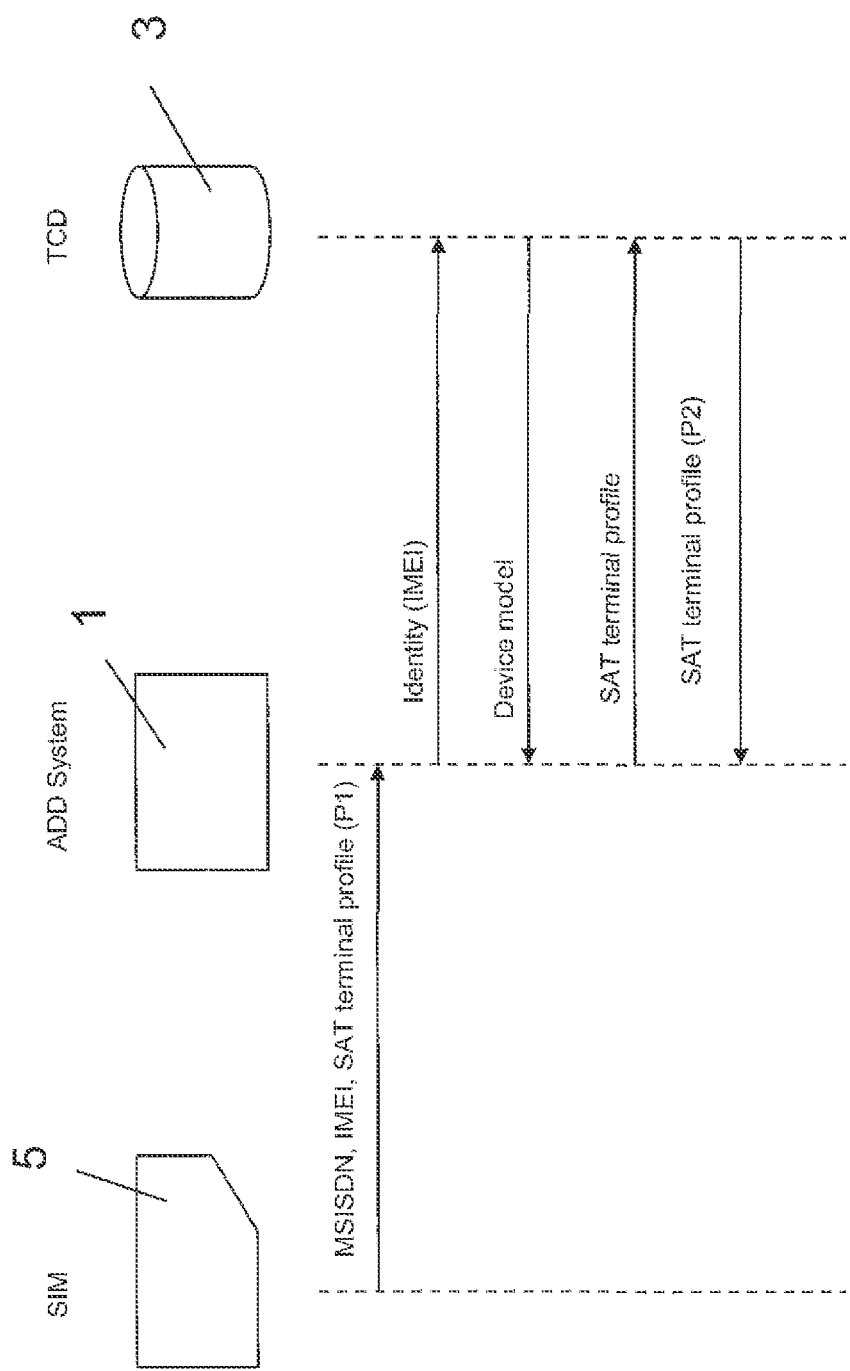

METHOD FOR IDENTIFYING A MOBILE TELEPHONE

The present invention refers to a method for identifying a mobile telephone.

The identity of a mobile device or mobile terminal or mobile telephone, called device below, is sometimes determined through automatic detection. Normally this means finding out the IMEI number of the device (International Mobile Equipment Identity). From said IMEI the phone model can be derived. Knowledge about the device identity is a prerequisite for certain operations towards the mobile telephone, such as settings provisioning.

It is possible to change the IMEI from the original IMEI. In such case ADD systems (Automatic Device Detection) then have problems to correctly identify the device telephone. This means that the ADD system either will not recognize the device at all or wrongly, e.g. as being a different model than it really is.

Manipulation of a device can be used for different fraud attacks. A subscriber could benefit from making the subscribers operator identify the subscribers device as a different device than it really is by getting access to more or better services, enjoy a cheaper rate plan etc.

An operator solely using the IMEI number for identification will suffer from such IMEI manipulations. Not only might they give fraud attempting subscribers privileges that they are not entitled to, but they might also give the subscribers a bad user experience, since the system has the wrong perception of what device the subscribers are using. This could for instance include failing to settings provision because the wrong provisioning protocols are being used, failing to install an application as the selection of application implementation does not match the platforms of the device etc.

The present invention provides a method for operators to identify a device with a higher degree of accuracy than the present ADD systems which only uses the IMEI number for identification.

The present invention refers to a method for identifying a mobile telephone, a device, where there is an ADD system (Automatic Device Detection) system connected to a network for mobile communication, the ADD system comprising a TCD (Terminal Capabilities Database) with SAT (SIM Application Toolkit) terminal profile values stored for all device models, which method is characterised in, the steps of retrieving the IMEI (International Mobile Equipment Identity) number from the device, retrieving the device model and the SAT terminal profile from the TCD by means of the retrieved IMEI, obtaining the SAT terminal profile of the actual device, comparing the SAT terminal profile of the actual device with the SAT terminal profile obtained from the TCD in the ADD system and considering the device as having the right IMEI number in case the SAT terminal profile of the actual device and the SAT terminal profile obtained from the TCD coincide.

Below the present invention is described in more detail in connection to exemplifying embodiments of the invention and in connection with the attached Figures, where FIG. 1 shows a flowchart illustrating a first embodiment of the invention FIG. 2 shows a flowchart illustrating a second embodiment of the invention.

The present invention relates to a method for identifying a mobile telephone, a device, where there is an ADD system 1 (Automatic Device Detection) system connected to a network 2 for mobile communication, the ADD system 1 comprising a TCD 3 (Terminal Capabilities Database) with SAT (Sim Application Toolkit) terminal profile values stored for all device 4 models. Each device is provided with a SIM card 5 for being able to communicate with other devices over the network 2.

With device is meant any device capable of communicating with other devices over said network, but it is exemplified below with a mobile telephone, called device.

According to the invention the method for identifying a device includes the steps of retrieving the IMEI (International Mobile Equipment Identity) number from the device, retrieving the device model and the SAT terminal profile from the TCD by means of the retrieved IMEI, obtaining the SAT terminal profile of the actual device, comparing the SAT terminal profile of the actual device with the SAT terminal profile obtained from the TDC in the ADD and considering the device as having the right IMEI number in case the SAT terminal profile of the actual device and the SAT terminal profile obtained from the TDC coincide.

ADD systems are commercially available, for example from Applicant.

The SAT terminal profile value is not unique for every device model, but more than one model can have the same SAT terminal profile. There is however not many terminal profile values shared by more than a few device models. In general, if two devices share a terminal profile value they are usually of the same model and very seldom manufactured by different vendors.

This means that the present method does not discover all IMEI manipulations, but the ones where the identity of a model has been altered to match a device model with a different terminal profile value. The probability to find devices, by the present method, where the IMEI number has been altered is high enough to make the method efficient.

In case an operator receives information from the ADD that the SAT terminal profile of a certain device does not match the SAT terminal profile it should have, the operator may take different measures. One could be to not provision the device with service settings, such as Internet connectivity, MMS etc. Another measure that could be taken, if the operator believes that there is a fraud, is to take an action resulting in that the subscriber will not enjoy a better rate plan when communicating with the device.

According to a preferred embodiment of the present invention the SAT terminal profile of the actual device is being obtained by means of the SIM card reading the terminal profile of the actual device.

According to a preferred embodiment of the invention the MSISDN (Mobile Station ISDN Number) and the IMEI are obtained from a network 2 probe and are being transferred to the ADD system 1.

The last mentioned embodiment of the present method includes the following steps, please see FIG. 1:

a) the ADD system 1 is caused to pick up MSISDN and IMEI from said network 2 b) the ADD system 1 queries said TCD 3 for the model of the device using the IMEI number as input c) the TCD 3 is caused to transfer information regarding the model to the ADD system 1 d) the ADD system 1 queries the device 4, via its SIM card 5, for the SAT terminal profile P1 and the SAT terminal profile P1 is transferred to the ADD system 1 e) the ADD system 1 is caused to query the TCD 3 for the SAT terminal profile for said model and the SAT terminal profile P2 is transferred to the ADD system 1 f) the ADD system 1 is caused to compare the two SAT terminal profiles (P1, P2) to determine if they match or not.

According to an alternative embodiment of the present invention the MSISDN (Mobile Station ISDN Number) and the IMEI are obtained by means of the SIM card 5 in the actual device 4.

The last mentioned embodiment of the present method includes the following steps, please see FIG. 2:

a) a device detection system is caused to detect that a subscriber has a new device 5 b) the device detection system is caused to transfer information that a new device has been found to the ADD system 1

In this scenario it is the SIM that detects the switch of device and sends off a "switch event" including MSISDN, IMEI and SAT terminal profile to the ADD system.

c) the ADD system 1 is caused to pick up MSISDN and IMEI and the SAT terminal profile (P1) from the SIM card 5 of the found device 4 d) the ADD system 1 queries said TCD 3 for the model of the device 4 using the IMEI number as input e) the TCD 3 is caused to transfer information regarding the model to the ADD system 1 f) the ADD system 1 is caused to query the TCD 3 for the SAT terminal profile for said model and the SAT terminal profile (P2) is transferred to the ADD system 1 g) the ADD system 1 is caused to compare the two SAT terminal profiles (P1, P2) to determine if they match or not.

A number of embodiments have been described above. It is however apparent that embodiments can be varied as regards detail solutions without diverting from the idea of the present invention, which idea is being based on comparing the SAT terminal profile for the device model being used with the SAT terminal profile for the device model stored in the system using the IMEI number.

The present invention shall not be considered to be limited to the afore described embodiments, since variations can be made within the scope of the accompanying claims.

The invention claimed is:

1. A method for identifying a mobile device, where there is an ADD system (Automatic Device Detection) connected to a network for mobile communication, the ADD system comprising a TCD (Terminal Capabilities Database) with SAT (SIM Application Toolkit) terminal profile values stored for all device models, the method comprising:

retrieving an IMEI (International Mobile Equipment Identity) number from the device, retrieving the device model and the SAT terminal profile (P2) from the TCD by means of the retrieved IMEI, obtaining the SAT terminal profile (P1) of the device from the device, comparing the SAT terminal profile (P1) obtained from the device with the SAT terminal profile (P2) obtained from the TCD in the ADD system, and considering the device as having an unmanipulated IMEI number in a case that the SAT terminal profile (P1) obtained from the device and the SAT terminal profile (P2) obtained from the TCD coincide.

2. The method according to claim 1, wherein the SAT terminal profile (P1) of the device is obtained by means of a SIM card reading the SAT terminal profile (P1) of the device.

3. The method according to claim 1, wherein a MSISDN (Mobile Station ISDN Number) and the IMEI are obtained from a network probe and are transferred to the ADD system.

4. The method according to claim 1, wherein a MSISDN (Mobile Station ISDN Number) and the IMEI are obtained by means of a SIM card in the device.

5. The method according to claim 1, further comprising:

a) the ADD system picking up a MSISDN (Mobile Station ISDN Number) and the IMEI from said network, b) the ADD system querying said TCD for the model of the device using the IMEI number as input, c) the TCD transferring information regarding the model to the ADD system, d) the ADD system querying the device, via its SIM card, for the SAT terminal profile (P1) and the SAT terminal profile (P1) is transferred to the ADD system, e) the ADD system querying the TCD for the SAT terminal profile (P2) for said model and the SAT terminal profile (P2) is transferred to the ADD system, and f) the ADD system comparing the two SAT terminal profiles (P1, P2) to determine if they match or not.

6. The method according to claim 1, further comprising:

a) a device detection system detecting that a subscriber has a new device, b) the device detection system transferring information that the new device has been found to the ADD system, c) the ADD system picking up a MSISDN (Mobile Station ISDN Number) and an IMEI and the SAT terminal profile (P1) from a SIM card of the new device, d) the ADD system querying said TCD for the model of the new device using the IMEI number as input, e) TCD transferring information regarding the model to the ADD system, f) the ADD system querying the TCD for the SAT terminal profile (P2) for said model and the SAT terminal profile (P2) is transferred to the ADD system, and g) the ADD system comparing the two SAT terminal profiles (P1, P2) to determine if they match or not.

7. The method according to claim 2, wherein a MSISDN (Mobile Station ISDN Number) and the IMEI are obtained from a network probe and are transferred to the ADD system.

8. The method according to claim 2, wherein a MSISDN (Mobile Station ISDN Number) and the IMEI are obtained by means of the SIM card in the device.

9. The method according to claim 1, wherein the SAT terminal profile (P1) is not unique for each device models of all the device models.

10. The method according to claim 1, further comprising considering the device as having a manipulated IMEI number in a case that the SAT terminal profile (P1) obtained from the device and the SAT terminal profile (P2) obtained from the TCD do not coincide.

11. The method according to claim 10, further comprising, restricting service settings to the device in the case the device is considered to have the a manipulated IMEI number.

12. The method according to claim 4, further comprising:

a) a device detection system detecting that a subscriber has a new device, and b) the device detection system transferring information that the new device has been found to the ADD system.

13. The method according to claim 12, further comprising in the case that the device is considered to have a manipulated IMEI number, sending off a switch event notice to the ADD system, the switch event notice including MSISDN, IMEI, and SAT terminal profile of the device.

14. A method for identifying a mobile device, where there is an ADD system (Automatic Device Detection) connected to a network for mobile communication, the method comprising:

storing a SAT (SIM Application Toolkit) terminal profile on a TCD (Terminal Capabilities Database) for each device model that communicates within the network;

retrieving an IMEI (International Mobile Equipment Identity) number from the device, retrieving the device model and the SAT terminal profile (P2) from the TCD based on the retrieved IMEI, obtaining the SAT terminal profile (P1) of the device directly from the device, comparing the SAT terminal profile (P1) obtained directly from the device with the SAT terminal profile (P2) obtained from the TCD, and considering the device as having an unmanipulated IMEI number in a case that the SAT terminal profile (P1) obtained from the device and the SAT terminal profile (P2) obtained from the TCD coincide.

15. The method according to claim 14, further comprising considering the device as having a manipulated IMEI number in a case that the SAT terminal profile (P1) obtained from the device and the SAT terminal profile (P2) obtained from the TCD do not coincide.

* * * * *